(12) United States Patent
Das et al.

(10) Patent No.: US 11,586,929 B2
(45) Date of Patent: Feb. 21, 2023

(54) METHOD AND SYSTEM FOR OPTIMIZING MEMORY REQUIREMENT FOR TRAINING AN ARTIFICIAL NEURAL NETWORK MODEL

(71) Applicant: Wipro Limited, Bangalore (IN)

(72) Inventors: Rishav Das, Howrah (IN); Sourav Mudi, Burdwan (IN)

(73) Assignee: Wipro Limited, Bangalore (IN)

( * ) Notice: Subject to any disclaimer, the term of this patent is extended or adjusted under 35 U.S.C. 154(b) by 988 days.

(21) Appl. No.: 16/370,901

(22) Filed: Mar. 30, 2019

(65) Prior Publication Data

US 2020/0265316 A1  Aug. 20, 2020

(30) Foreign Application Priority Data

Feb. 15, 2019 (IN) .............................. 201941006134

(51) Int. Cl.
| | |
|---|---|
| *G06N 3/08* | (2006.01) |
| *G06N 3/084* | (2023.01) |
| *G06N 3/04* | (2023.01) |
| *G06F 40/295* | (2020.01) |
| *G06F 40/216* | (2020.01) |

(52) U.S. Cl.
CPC ........... *G06N 3/084* (2013.01); *G06F 40/216* (2020.01); *G06F 40/295* (2020.01); *G06N 3/0472* (2013.01)

(58) Field of Classification Search
CPC .... G06F 40/216; G06F 40/284; G06F 40/295; G06F 40/30; G06N 3/0445; G06N 3/0454; G06N 3/0472; G06N 3/063; G06N 3/084; G10L 15/16
See application file for complete search history.

(56) References Cited

U.S. PATENT DOCUMENTS

| | | |
|---|---|---|
| 10,019,668 B1 | 7/2018 | Woo |
| 2016/0350645 A1 | 12/2016 | Brothers et al. |
| 2016/0364644 A1 | 12/2016 | Brothers et al. |
| 2018/0357541 A1* | 12/2018 | Chen ........................ G06N 3/04 |
| 2019/0287685 A1* | 9/2019 | Wu ........................ G06F 40/30 |

* cited by examiner

*Primary Examiner* — Brent Johnston Hoover
(74) *Attorney, Agent, or Firm* — Finnegan, Henderson, Farabow, Garrett & Dunner, LLP

(57) ABSTRACT

This disclosure relates to method and system for optimizing memory requirement for training an artificial neural network (ANN) model employed for natural language processing (NLP). In one embodiment, the method may include receiving a plurality of training parameters and a plurality of model parameters, selecting a set of model parameters from among the plurality of model parameters for training the ANN model based on a characteristic and an architecture of the ANN model, masking the set of model parameters in one or more layers of the ANN model based on a set of pre-defined rules to generate a set of masked model parameters, determining an amount of memory required for training the ANN model based on the set of masked model parameters, and providing the set of masked model parameters for training the ANN model when the amount of memory required is less than a determined threshold.

17 Claims, 7 Drawing Sheets

METHOD AND SYSTEM FOR OPTIMIZING MEMORY REQUIREMENT FOR TRAINING AN ARTIFICIAL NEURAL NETWORK MODEL

TECHNICAL FIELD

This disclosure relates generally to natural language processing (NLP), and more particularly to method and system for optimizing memory requirement for training an artificial neural network (ANN) model employed for NLP.

BACKGROUND

Natural language processing (NLP) is a powerful deep learning tool in the field of artificial intelligence (AI) that deals with understanding, processing, and generation of natural language. A wide variety of applications including, but not limited to, search engine optimization (SEO) and chatbots employ deep learning based NLP engines. Typically, NLP engines employ artificial neural network (ANN) models including, but not limited to, recurrent neural network (RNN) models, long short-term memory (LSTM) models, and convolution neural network (CNN) models. However, it is computationally and memory intensive to train these ANN models.

For example, while training such ANN models, a huge number of neural nodes may be generated and computed in parallel. The different set of hidden layers along with the thousands of neural nodes operating in parallel in the processors (e.g., CPU cores, GPU cores, etc.) may consume a lot of memory. Typically, low end computational systems do not support such computational and memory requirement. Another problem is online training of the ANN models. It may include the feature of that instance that may be used in the ANN model for concurrent training. This may be supported by the high end processors. Again, the low end computational systems may not include high end processor. The high end computational systems, required to perform the training of these ANN models, are costly and, therefore, increase the cost of implementation of any NLP project.

SUMMARY

In one embodiment, a method for optimizing memory requirement for training an artificial neural network (ANN) model employed for natural language processing (NLP) is disclosed. In one example, the method may include receiving a plurality of training parameters and a plurality of model parameters. It should be noted that the plurality of training parameters may be derived from training data corpus for training the ANN model, while the plurality of model parameters may be associated with the ANN model and may be derived based on the plurality of training parameters and input from user with respect to the ANN model. The method may further include selecting a set of model parameters from among the plurality of model parameters for training the ANN model based on a characteristic and an architecture of the ANN model. The method may further include masking the set of model parameters in one or more layers of the ANN model based on a set of pre-defined rules to generate a set of masked model parameters. The method may further include determining an amount of memory required for training the ANN model based on the set of masked model parameters. The method may further include providing the set of masked model parameters for training the ANN model when the amount of memory required is less than a determined threshold.

In one embodiment, a system for optimizing memory requirement for training an ANN model employed for NLP is disclosed. In one example, the system may include a memory optimization device that may include at least one processor and a memory communicatively coupled to the at least one processor. The memory may store processor-executable instructions, which, on execution, may cause the processor to receive a plurality of training parameters and a plurality of model parameters. It should be noted that the plurality of training parameters may be derived from training data corpus for training the ANN model, while the plurality of model parameters may be associated with the ANN model and may be derived based on the plurality of training parameters and input from user with respect to the ANN model. The processor-executable instructions, on execution, may further cause the processor to select a set of model parameters from among the plurality of model parameters for training the ANN model based on a characteristic and an architecture of the ANN model. The processor-executable instructions, on execution, may further cause the processor to mask the set of model parameters in one or more layers of the ANN model based on a set of pre-defined rules to generate a set of masked model parameters. The processor-executable instructions, on execution, may further cause the processor to determine an amount of memory required for training the ANN model based on the set of masked model parameters. The processor-executable instructions, on execution, may further cause the processor to provide the set of masked model parameters for training the ANN model when the amount of memory required is less than a determined threshold.

In one embodiment, a non-transitory computer-readable medium storing computer-executable instructions for optimizing memory requirement for training an ANN model employed for NLP is disclosed. In one example, the stored instructions, when executed by a processor, may cause the processor to perform operations including receiving a plurality of training parameters and a plurality of model parameters. It should be noted that the plurality of training parameters may be derived from training data corpus for training the ANN model, while the plurality of model parameters may be associated with the ANN model and may be derived based on the plurality of training parameters and input from user with respect to the ANN model. The operations may further include selecting a set of model parameters from among the plurality of model parameters for training the ANN model based on a characteristic and an architecture of the ANN model. The operations may further include masking the set of model parameters in one or more layers of the ANN model based on a set of pre-defined rules to generate a set of masked model parameters. The operations may further include determining an amount of memory required for training the ANN model based on the set of masked model parameters. The operations may further include providing the set of masked model parameters for training the ANN model when the amount of memory required is less than a determined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
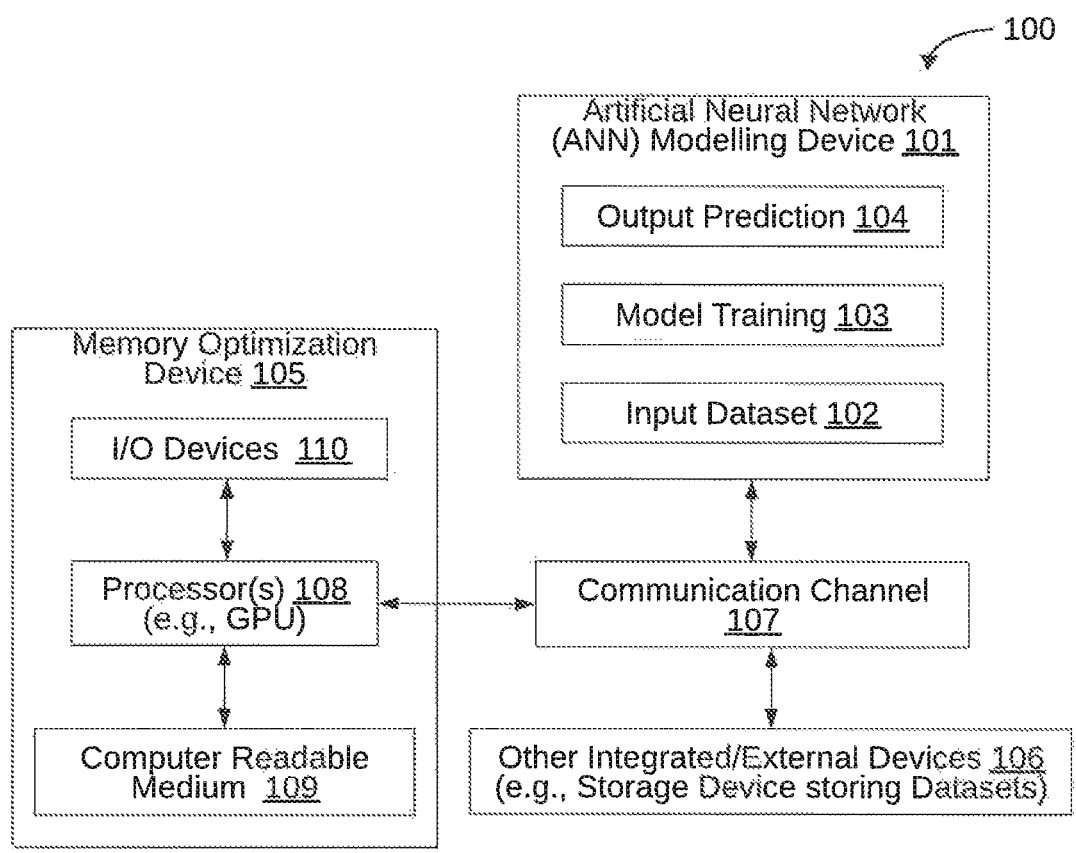
FIG. 1 is a block diagram of an exemplary system for optimizing memory requirement for training an artificial neural network (ANN) model employed for natural language processing (NLP), in accordance with some embodiments of the present disclosure.

Referring now to FIG. 1, an exemplary system 100 for optimizing memory requirement for training an artificial neural network (ANN) model employed for natural language processing (NLP), is illustrated in accordance with some embodiments of the present disclosure. The system 100 may include an ANN modelling device 101 for building, training, and implementing an ANN model for the NLP. In particular, the ANN modelling device 101 may be responsible for receiving and processing input dataset at block 102, training of the ANN model at block 103, and output prediction at block 104. The system 100 may further include a memory optimization device 105 for managing memory during training of the ANN model. In particular, the memory optimization device 105 may be responsible for optimizing memory requirement while training the ANN model. As will be appreciated, each of these devices 101, 105 may be a computing device having data gathering and processing capability. For example, the each of these devices 101, 105 may include, but may not be limited to, server, desktop, laptop, notebook, netbook, tablet, smartphone, mobile phone, or the like. Additionally, the system 100 may include other integrated or external devices 106 such as integrated or networked storage device for storing datasets, remote servers or computing systems (for example, of service providers), remote digital devices (for example, of consumers), or field-installed products (for example, navigation systems, or the like).

The devices 101, 105, 106 may interact with each other over a communication channel 107 (for example, data bus, wired communication network (e.g., Ethernet), wireless communication network (e.g., Wi-Fi), mobile communication network (e.g., long term evolution (LTE) network), Internet, etc. that may support data delivery) for exchanging various data and instructions. For example, the memory optimization device 105 may receive dataset from the storage device either directly or through the communication network. Further, the ANN modelling device 101 may receive dataset from the storage device either directly or through the memory optimization device 105.

As stated above, the system 100 may implement the memory optimization device 105 so as to optimize memory requirement for training the ANN model. As will be described in greater detail in conjunction with FIGS. 2-6, the memory optimization device 105 may receive multiple training parameters and multiple model parameters. It should be noted that the multiple training parameters may be derived from training data corpus for training the ANN model, while the multiple model parameters may be associated with the ANN model and may be derived based on the plurality of training parameters and input from user with respect to the ANN model. Further, the memory optimization device 105 may select a set of model parameters from among the multiple model parameters for training the ANN model based on a characteristic and an architecture of the ANN model, mask the set of model parameters in one or more layers of the ANN model based on a set of pre-defined rules to generate a set of masked model parameters, determine an amount of memory required for training the ANN model based on the set of masked model parameters, and provide the set of masked model parameters for training the ANN model when the amount of memory required is less than a determined threshold.

The memory optimization device 105 may include one or more processors 108, a computer-readable medium (e.g., a memory) 109, and an input/output device 110. Each of the one or more processors 108 may include a central processing unit (CPU) or a graphical processing unit (GPU), Typically, the GPU may include more parallel cores (say, about of 30-40 parallel cores) than the CPU (say, about 8 parallel cores). As will be appreciated, the execution of the ANN model may require parallel operation, but one of the objectives of the present disclosure is to reduce the volume of the dataset and to represent them in a form that may enable faster execution of the ANN model with minimum number of cores and memory.

The computer-readable storage medium 109 may store instructions that, when executed by the one or more processors 108, cause the one or more processors 108 to optimizing memory requirement for training the ANN model, in accordance with aspects of the present disclosure. The computer-readable storage medium 102 may also store various data (e.g., training data corpus, training parameters, ANN model, user input with respect to the ANN model, model parameters, selected model parameters, masked model parameters, pre-defined rules for performing masking, an amount of memory required for training the ANN model, memory threshold, resultant, etc.) that may be captured, processed, and/or required by the memory optimization device 105. The memory optimization device 105 may interact with a user via the input/output device 110.

Figure 2:
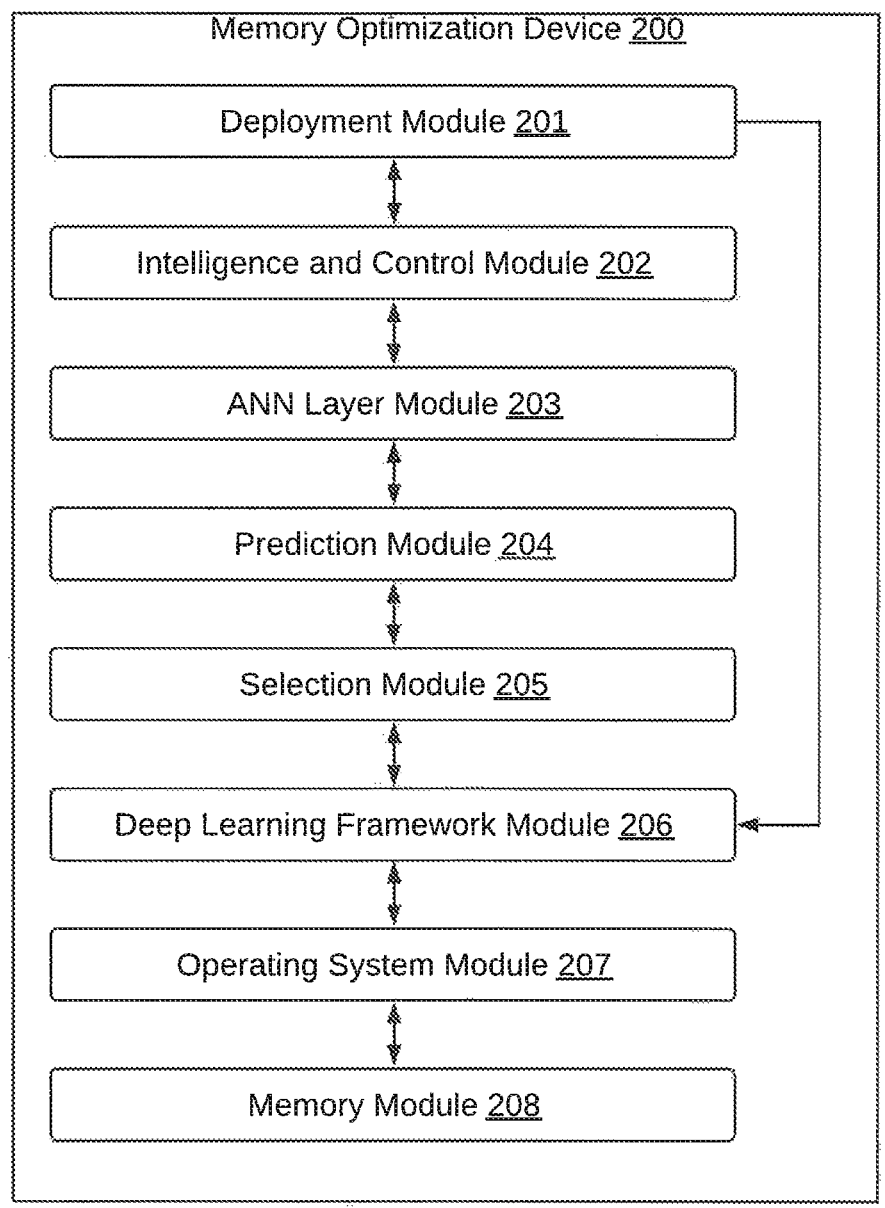
FIG. 2 is a functional block diagram of a memory optimization device, implemented by the system of FIG. 1, in accordance with some embodiments of the present disclosure.

Referring now to FIG. 2, a functional block diagram of the memory optimization device 200, implemented by the system 100 of FIG. 1, is illustrated in accordance with some embodiments of the present disclosure. The memory optimization device 200 may include various modules that perform various functions so as to optimize memory requirement for training the ANN model. In some embodiments, the memory optimization device 200 may include a deployment module 201, an intelligence and control module 202, an ANN layer module 203, a prediction module 204, a selection module 205, a deep learning framework (DLF) module 206, an operating system (OS) module 207, and a memory module 208. As will be appreciated by those skilled in the art, all such aforementioned modules 201-208 may be represented as a single module or a combination of different modules. Moreover, as will be appreciated by those skilled in the art, each of the modules 201-208 may reside, in whole or in parts, on one device or multiple devices in communication with each other.

As illustrated in FIG. 2, the ANN models may be accessed from the DLF module 206. Further, the DLF module 206 may access variables from intelligence and control module 202, which may help to define variables in the ANN architecture. Each of the modules 201-208 may now be described in greater detail herein below.

The deployment module 201 may link the hidden layer set of tokens, one hot coded vector, intent, entities with the DLF module 206. The feature from the selection module 205 may be mapped with the new embedded feature so that the data point may shrink rather than increase while performing training of the ANN model. Upon completion of mapping, the training for the ANN model with shrinking topography may be initiated. The accuracy levels may be captured and again same set of mapping may be initiated for very epochs in the training set. It should be noted that such process may reduce the on-demand memory expansion while training.

The intelligence and control module 202 may perform mathematical operation for prediction of the failure and return back with score. Further, the intelligence and control module 202 may control all the commands and triggering of the work process of different modules. In short, the intelligence and control module 202 may help in administration of the memory optimization device 200.

The ANN layer module 203 may be handled by the intelligence and control module 202 for manipulating the dataset based on the size of tokens, word vectors, POS tagger, intents, entities, and so forth. For example, the word vector may be represented as class and the tokens may be cleaned, while the intent and the entities may be left as such. In some embodiments, these tokens may be lemmatized and stemmed by the intelligence and control module 202. This may result in reduction of data size (say, by 20%) and, therefore, memory consumption from overall memory consumption for all complete tokens. Further, in some embodiments, the duplicate token may be removed by adding more weight to the parent token only. This may result in further reduction of data size (say, by another 20%) and, therefore, memory consumption from overall memory consumption. It should be noted that, in some embodiments the ANN layer module 203 may perform these operations in the hidden layers of the ANN model.

By way of an example, a training corpus that has same intent may generally have multiple duplicate tokens. As stated above, such duplicate tokens may be reduced to one token with an adjusted weight for the amount of duplication. Further, the word vectors may categorized into multiple classes, and may be replaced as those classes. In other words, each class may be linked to only those word vectors that belong to that class. This may reduce the size of word vectors. Moreover, unnecessary pool of classes may not be used for training. Thus, every word vectors may be masked and may be represented in form of binary sequence (0, 1, 00, 01, 10, 11, 000, 001, 010, etc.) representing their respective classes. Every one hot encoded vector may belong to vector class. For example, if the word meaning is emotion, then the vector will be under emotion class. This sequence may further reduce the one hot encoded vector by another 20% of the whole set of memory. In this manner, the intelligence and control module 202 may substantially reduce the memory required (say, by 60%) while training the dataset.

The prediction module 204 may be responsible for determining the amount of memory required. Further, the prediction module 204 may back propagate, based on the determined amount, so as to reduce the volume of the datasets. Based on the featured extracted and selected number of parameters, the ANN model may take all the parameters as an X node (but not the data points which mostly occurs in the real-time training) and may determine the amount of memory to be consumed. The parameters may include, but may not be limited to, the number of tokens to be trained, word vector to be handled, intents, entities and so forth. Upon predicting the amount of memory required, the dataset may be processed in the hidden layers of the ANN model.

The selection module 205 may be controlled by the intelligence and control module 202. When the dataset is taken from the pool of data for pre-processing, they may be stored in the memory. Thereupon, the features or model parameters may be extracted from these datasets. It should be noted that, when extracting the model parameters, the data size may increase based on the parameters to be trained. The intelligence and control module 202 may select the model parameter from among the extracted model parameters. The intelligence and control module 202 may take only the selected model parameters and store in the selection module 205 as the selected model parameters. The model parameters may be selected based on the user feature extraction. Typically, same set of model parameters may be selected by the intelligence and control module for a given NLP application.

The DLF module 206 may help to access all the required libraries or sub libraries that may be required for generating the ANN model. It should be noted that these libraries or sub libraries may be accessed by the mean of programming language. The DLF module 206 may also include, but may not be limited to, convolutional neural network (CNN) model, recurrent neural network (RNN) model, long short-term memory (LSTM) model, predictive neural network model, and so forth. These neural network models may be stored in form of libraries which may be accessed by developer using a number of programming languages. Once these libraries are called, memory space reservation may be initiated based on the amount of required space by the model.

The OS module 207 is the heart of any computing system. The implementation may vary for GPU and CPU but work function may be, typically, same. The OS module 207 may include kernel and shell. The kernel may collaborate with DLF module 206 via a number of programming language. The programming language may pass the process control to the kernel of the OS, where the kernel may process with manipulation of hardware for execution of the event. The shell is the user interface that may pass the information to the kernel for further communication.

The memory module 208 may help to store the dataset temporarily. The memory module 208 may be employed while computation of the datasets. For every operations in dataset, the instance of the memory may be generated where the dataset may be used to operate with that instance. The interchangeable dataset within two instance may help to share the information about two different type of operation or dataset. This may help in reducing computation wherein other memory architecture, the communication, or interchange of the values may be, generally, taken by kernel and shell based on the process.

The various modules 201-208 may communicate with each other or with associated/external devices (for example, storage device, ANN model, or the like) through various connections or interfaces. As will be appreciated, each of the connections or interfaces may acquire or transfer data from one module 201-208 or associated/external devices to other module 201-208 or associated/external devices using standard wired or wireless data connections means. For example, each of the connections or interfaces may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, or the like.

As will be appreciated, the memory optimization device 200 described above may provide a unique memory management technique for training the ANN model for NLP. In particular, the memory optimization device 200 may reduce the amount of memory required while training the ANN model for NLP, The memory optimization device 200 may reduce the overall training size by understanding the data points, size of the training sets, size of the output neurons those need to be computed in the hidden layer etc., analyzing all these parameters, and predicting the size required by camouflaging these parameters into hidden layers of the ANN model. As will be appreciated, this not only reduces the memory required by the ANN model while training, but also the amount of computation involved. Thus, the memory optimization device 200 may enable any medium scale computing resource to be used for designing, developing, and implementing deep learning based NLP engines.

It should be noted that the memory optimization device 200 may be implemented in programmable hardware devices such as programmable gate arrays, programmable array logic, programmable logic devices, or the like. Alternatively, the memory optimization device 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for optimizing memory requirement for training an ANN model employed for NLP. For example, the exemplary system 100 and the associated memory optimization device 200 may optimize memory requirement for training the ANN model employed for NLP by the processes discussed herein. In particular, as will be appreciated by those of ordinary skill in the art, control logic and/or automated routines for performing the techniques and steps described herein may be implemented by the system 100 and the associated memory optimization device 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
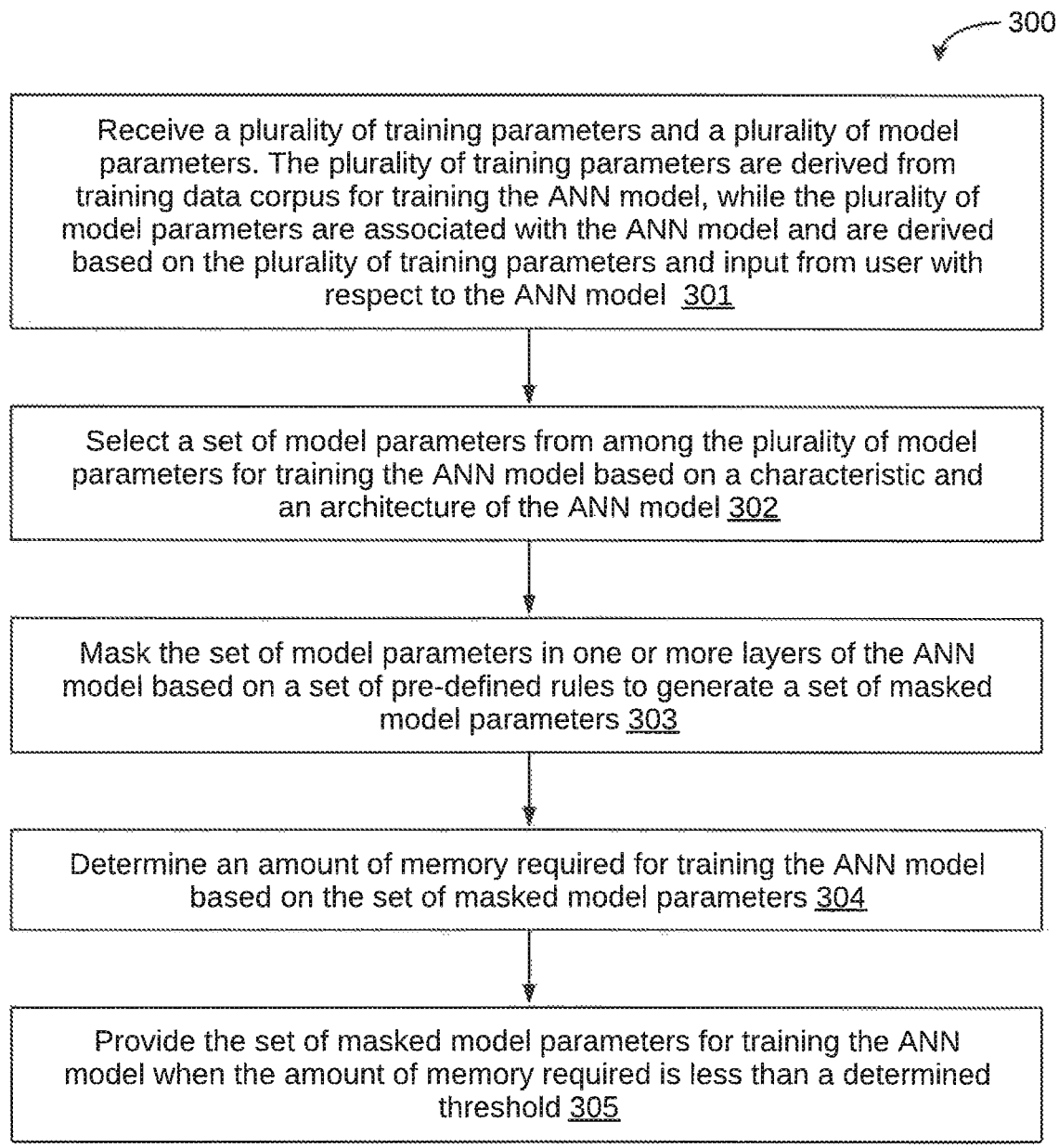
FIG. 3 is a flow diagram of an exemplary process for optimizing memory requirement for training an ANN model employed for NLP, in accordance with some embodiments of the present disclosure.

For example, referring now to FIG. 3, exemplary control logic 300 for optimizing memory requirement for training the ANN model employed for NLP via a system, such as system 100, is depicted via a flowchart in accordance with some embodiments of the present disclosure. As illustrated in the flowchart, the control logic 300 may include the steps of receiving a plurality of training parameters and a plurality of model parameters at step 301, selecting a set of model parameters from among the plurality of model parameters for training the ANN model based on a characteristic and an architecture of the ANN model at step 302, masking the set of model parameters in one or more layers of the ANN model based on a set of pre-defined rules to generate a set of masked model parameters at step 303, determining an amount of memory required for training the ANN model based on the set of masked model parameters at step 304, and providing the set of masked model parameters for training the ANN model when the amount of memory required is less than a determined threshold at step 305. It should be noted that the plurality of training parameters may be derived from training data corpus for training the ANN model, while the plurality of model parameters may be associated with the ANN model and may be derived based on the plurality of training parameters and input from user with respect to the ANN model. In some embodiments, the control logic 300 may further include the step of iteratively selecting an updated set of model parameters, masking the updated set of model parameters, and determining the amount of memory required based on an updated set of masked model parameters until the amount of memory required is less than the determined threshold.

Additionally, in some embodiments, the control logic 300 may further include the steps of receiving the training data corpus, deriving the plurality of training parameters by processing the training data corpus, and temporarily storing the plurality of training parameters. Additionally, in some embodiments, the control logic 300 may further include the steps of receiving the input from the user, deriving the plurality of model parameters based on the plurality of training parameters and the input from the user, and deploying the plurality of model parameters. Moreover, in some embodiments, the control logic 300 may further include the steps of training the ANN model with the set of masked model parameters, and unmasking a resultant or output by back-propagating using the set of pre-defined rules.

In some embodiments, masking the set of model parameters at step 303 may include the step of masking the set of model parameters in one or more hidden layers of the ANN model. Additionally, in some embodiments, the plurality of model parameters may include at least one of tokens, intents, named entities, word vectors, part of speech (PoS) tags, input features, input neurons, and output neurons. In such embodiments, masking the set of model parameters using the set of pre-defined rules at step 303 may include at least one of stemming tokens, lemmatizing tokens, de-duplicating tokens, adjusting weights of tokens, converting tokens in hard coded binary numbers, and converting token types in hard coded binary numbers.

In some embodiments, determining the amount of memory required at step 304 may include the step of performing multi-linear regression with known values of the set of model parameters. In such embodiments, determining the amount of memory required at step 304 may further include the step of performing logistic regression when one or more of the known values are binary values.

Figure 4:
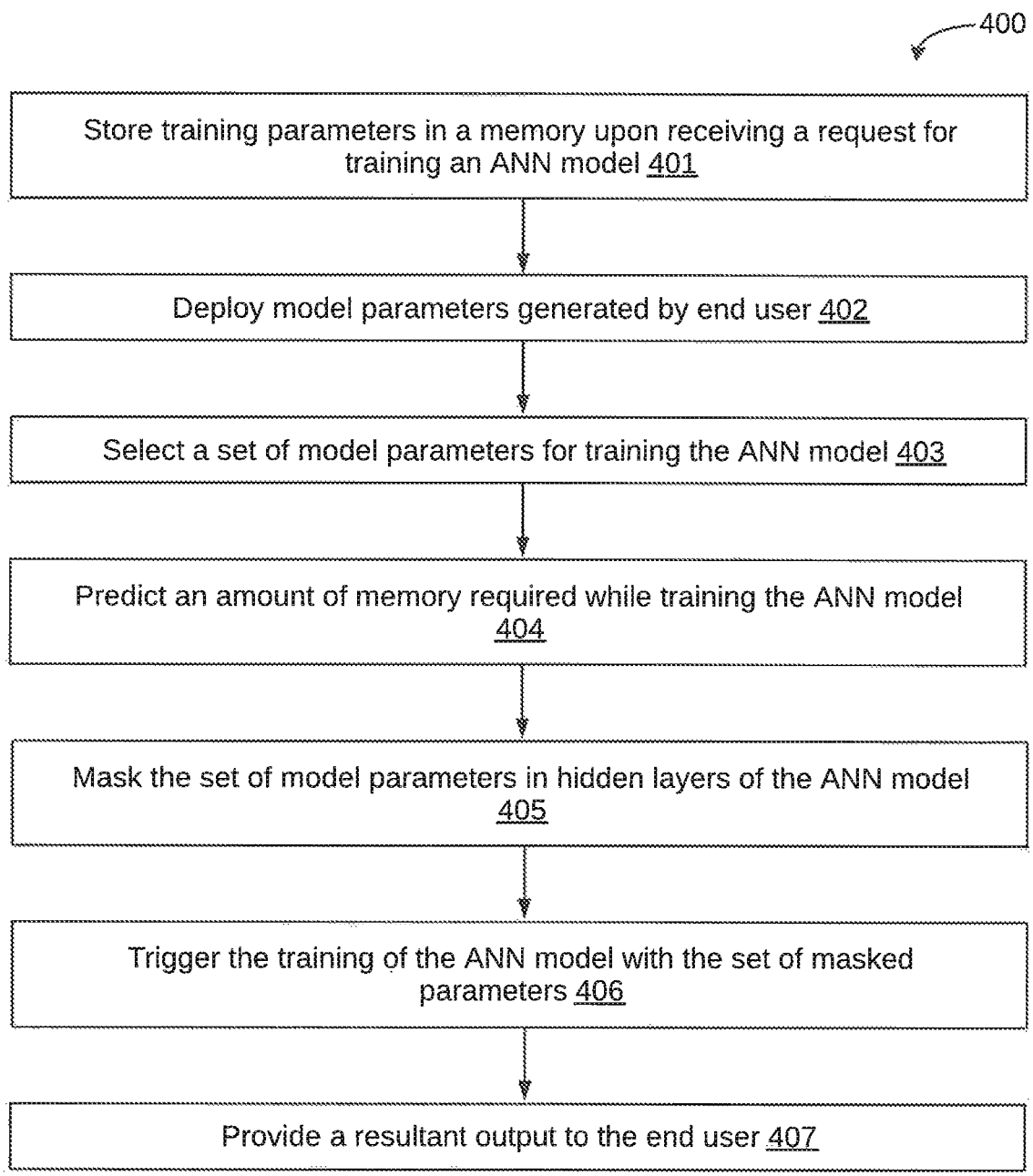
FIG. 4 is a flow diagram of a detailed exemplary process for optimizing memory requirement for training an ANN model employed for NLP, in accordance with some embodiments of the present disclosure.

Referring now to FIG. 4, exemplary control logic 400 for optimizing memory requirement for training an ANN model employed for NLP is depicted in further detail via a flowchart, in accordance with some embodiments of the present disclosure. As illustrated in the flowchart, the control logic 400 may include the steps of storing training parameters in a memory upon receiving a request for training the ANN model at step 401, deploying model parameters generated by end user at step 402, selecting a set of model parameters for training the ANN model at step 403, predicting an amount of memory required while training the ANN model at step 404, masking the set of model parameters in hidden layers of the ANN at step 405, triggering the training of the ANN model with the set of masked parameters at step 406, and providing a resultant or output to the end user at step 406. Each of these steps will be described in greater detail herein below.

At step 401, the datasets may be generated, by an end user, using one or more programming languages and deep learning libraries. The datasets may include whole training corpus that the end user may select for training the ANN model. Once the training is initiated by the end user, the intelligence and control module 202 may receive an acknowledgement via a kernel through a system call. Further, the intelligence and control module 202 may temporarily store these training parameters in a memory for subsequent selection and masking in one or more hidden layers of the ANN model.

At step 402, the end user may generate model parameters. The model parameters may include, but may not be limited to, training data tokens, intents, entities, word vectors, PoS taggers, and the like. It should be noted that the model parameters may solely depend on the user data generation. Any training dataset may include a large corpus of words with various linguistic features. The ANN model (e.g., LSTM model) may, generally, train in a sequence manner based on those words along with linguistic features. Each word may be a token and may be encoded as a word vector for unique representation in the corpus.

At step 403, the selection module 205 in conjunction with the intelligence and control module 202 may select the set of model parameters for training the ANN model. The selection module 205 may select the data points that may be used by the prediction module 204 and the ANN layer module 203 so as to determine the amount of memory required for training the ANN model as well as to mask the tokens or vectors. Moreover, the selection module 205 may hold an accountability of generalized model parameters and may take the values based on model parameters set by the end user.

Figure 5:
FIG. 5 is a tabular representation of an exemplary set of selected model parameters and their respective values that may be used to determine an amount of memory required for training the ANN model, in accordance with some embodiments of the present disclosure.

Referring now to FIG. 5, a tabular representation 500 of an exemplary set of selected model parameters and their respective values is illustrated, in accordance with some embodiments of the present disclosure. In the illustrated embodiments, the selected model parameters may include token count 502, POS tagger count 503, intent number 504, entity number 505, values number 506, input neurons 507, and output neurons 508. As stated above, the values of selected model parameters may be used to determine an amount of memory required by the system while training the ANN model and computing the hidden layers.

Referring back to FIG. 4, at step 404, the prediction module 204 may perform a prediction based on the set of model parameters selected at step 403. The prediction may be performed by performing multi-linear regression with known values of the selected model parameters. Additionally, a logistic regression may be performed when one or more of the known values are binary values. By way of an example, taking selected model parameters (e.g., token counts, POS tagger counts, intent number, input features, input neurons, output neurons, etc.) into consideration, the amount of memory required may be determined as follows:

Y=value to be predicted (i.e., being the amount of memory required), and

X=initialized value (i.e., the value of selected model parameters (e.g., tokens count or number of tokens))

The multi-linear regression and/or the logistic regression may be performed over the values of X to predict the value of Y via an algorithm. It should be noted that there may be more than one X such as X1, X2, X3, X4, etc. Each of these X may hold initialized value of selected parameters such as intent number, entities number, input neurons, output neurons, etc. The historical numerical values may be listed for each X and Y. Additionally, the algorithm may compute squares of X's and Y's in order to reduce negative values. Further, the algorithm may multiply the X's and Y's (for example, X1.Y, X2.Y, X3.Y, etc.). Moreover, the algorithm may take an average of X, Y, and XY by taking summation of all the values and then dividing by the number of the values added. The algorithm may then compute three values SXX, SXY, and SYY as follows:

$$SXX = \text{Sum}(X^2) - n(X\text{avg}), \quad \text{Equation (1)}$$

$$SYY = \text{Sum}(Y^2) - n(Y\text{avg}), \quad \text{and Equation (2)}$$

$$SXY = \text{Sum}(XiYi) - n(X\text{avg} \cdot Y\text{avg}) \quad \text{Equation (3)}$$

Further, the algorithm may compute a slope (i.e., beta) and a parameter alpha as follows:

$$\text{beta} = SXY/SXX, \text{ and} \quad \text{Equation (4)}$$

$$\text{alpha} = Y\text{avg} - (\text{beta}^* X\text{avg}) \quad \text{Equation (5)}$$

Now, the algorithm may compute the predicted value Y (i.e., amount of storage required) using input value X as follows:

$$Y = \text{alpha} + (\text{beta}^* X) \quad \text{Equation (6)}$$

Further, the algorithm may compute a standard error, which may be a measure of difference between the predicted value (Y) and an actual observed value, as follows:

$$\text{Standard Error} = SYY(SXY^2/SXX) \quad \text{Equation (7)}$$

As will be appreciated, the standard error may help in providing an accuracy of the prediction algorithm so as to take necessary corrective steps (if required).

At step 405, based on the amount of memory required for actual operations while training the ANN model, the selected model parameters may be masked based on a set of pre-defined rules. The masked data may then be stored in the memory for subsequent training of the ANN model. An exemplary set of pre-defined rules may include, but may not be limited to, following:

a) stemming the tokens (e.g., reducing word forms to its root),
b) lemmatizing the tokens upon stemming (e.g., reducing the word form to linguistically valid lemmas),
c) de-duplicating the tokens (e.g., removing duplicate tokens),
d) adjusting weights of remaining tokens (e.g., increasing weights of parent tokens based on the number of duplicate tokens for respective parent tokens),
e) converting parent tokens into one hot encoded vector in form of binary based on a sequence (for example, starting from 0, and then moving to 1, 00, 01, 10, 11, 000, 001, 010, etc.), and
f) representing token types as a class of the tokens and the class of the tokens and denoted by binary numbers (for example, emotions (1101), angry (1110), happy (1011)). It should be noted that the class of tokens may depend on the tokens used by the end user.

At step 406, the masked data may be provided for training the ANN model. The intelligence and control module 202 may trigger the training process via kernel so as to initiate internal library function. Upon initiation, the internal library function may start the training of the ANN model with the masked data. The masked data may be retrieved from the memory and training of the ANN model may be performed in one or more processor cores. The training may undergo multiple epochs. Additionally, the training data may be stored in the memory for further usage.

At step 407, after undergoing multiple epoch and layers of training, the resultant may be first stored in the memory. The resultant may be then unmasked by back-propagating using the set of pre-defined rules. In other words, the representative may be removed. Generally, the resultant may be fully connected single output with score of learning. Hence, the response to the set of the input of the natural language processing may be determined by the end user.

Figure 6:
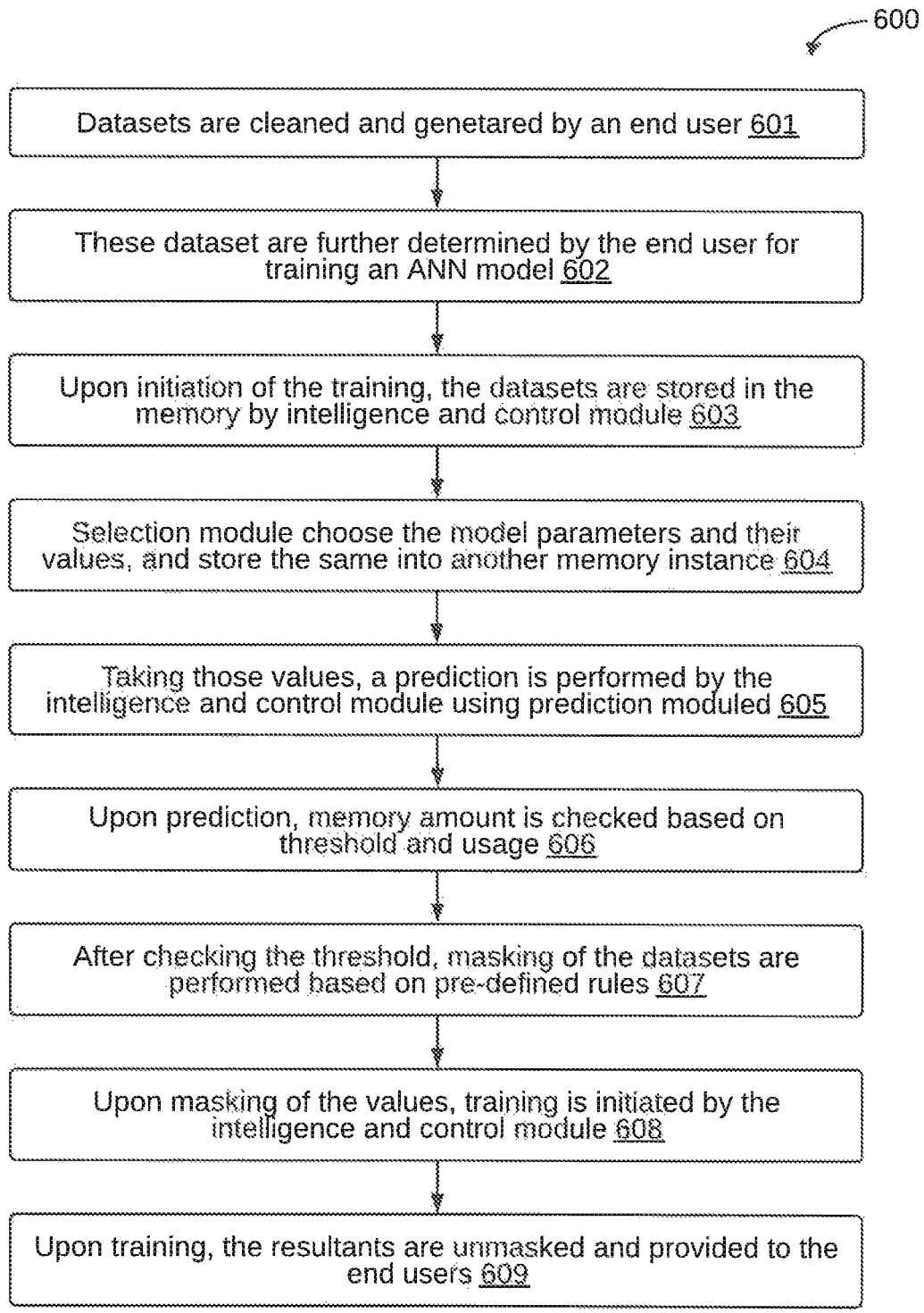
FIG. 6 is a flow diagram of a further detailed exemplary process for optimizing memory requirement for training an ANN model employed for NLP, in accordance with some embodiments of the present disclosure.

Referring now to FIG. 6, exemplary control logic 600 for optimizing memory requirement for training an ANN model employed for NLP is depicted in greater detail via a flowchart, in accordance with some embodiments of the present disclosure. As illustrated in the flowchart, at step 601, datasets may be cleaned and generated by an end user. At step 602, these datasets may be further determined by the end user for training the ANN model. Upon initiation of the training, at step 603, the dataset may be stored in the memory by the intelligence and control module 202. At step 604, the selection module 205 may chose the model parameters and their values, and may store the same into another memory instance. At step 605, a prediction may be performed by the intelligence and control module 202 using the prediction module 204 based on the values of the selected model parameters. Upon prediction, at step 606, memory amount may be checked based on threshold and usage. After checking the threshold, at step 607, masking of the datasets may be performed based on pre-defined rules by the intelligence and control module 202 using the ANN layer module 203. Upon masking of the values of the selected model parameters, at step 608, training of the ANN model may be initiated by the intelligence and control module 202. Upon training, at step 609, the resultant may be unmasked and provided to the end users.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
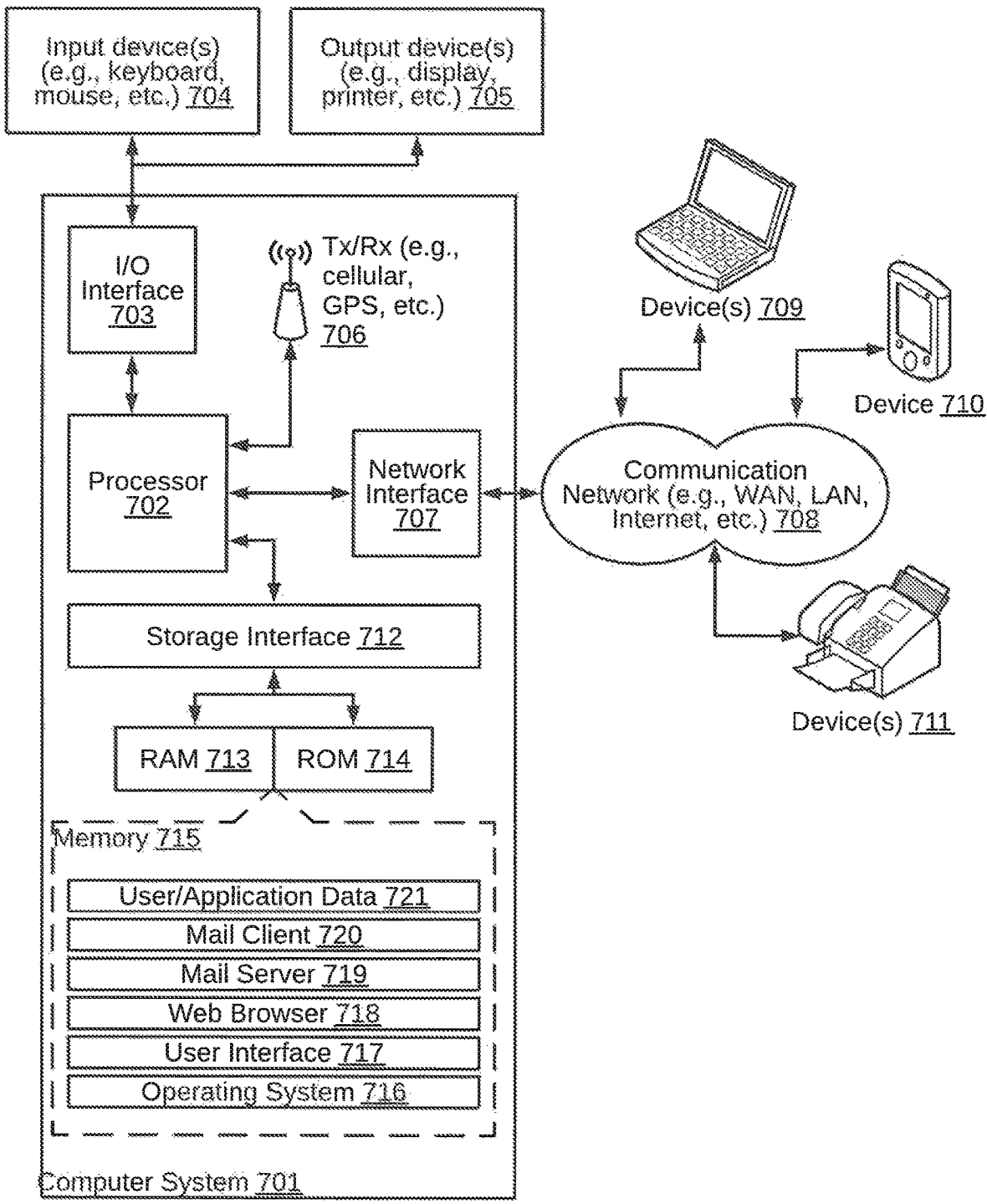
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 701 for implementing embodiments consistent with the present disclosure is illustrated. Variations of computer system 701 may be used for implementing system 100, ANN modelling device 101, and memory optimization device 105 for optimizing memory requirement for training the ANN model employed for NLP. Computer system 701 may include a central processing unit ("CPU" or "processor") 702. Processor 702 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 701 may implement a web browser 718 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 701 may implement a mail server 719 stored program component. The mail server may be an Internet mail server such as MICROSOFT® EXCHANGE®, or the like. The mail server may utilize facilities such as ASP, ActiveX, ANSI C++/C#, MICROSOFT .NET® CCI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 701 may store user/application data 721, such as the data, variables, records, etc. (e.g., training data corpus, training parameters, ANN model, user input with respect to the ANN model, model parameters, selected model parameters, masked model parameters, pre-defined rules for performing masking, an amount of memory required for training the ANN model, memory threshold, resultant, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for memory management and optimization while training an ANN model employed for NLP, In particular, the techniques provide for reduction in the required memory size while training the ANN model by reducing large set of neurons and by reducing overall training dataset size. Thus, the techniques help reduce the requirement of physical memory while training, thereby reducing cost of memory. As will be appreciated, the reduction in large set of neurons and overall training dataset size may also reduce the computational complexity. The reduction in computation complexity enables the ANN model to reduce computation cost by operating within less expensive central processing unit (CPU), and limiting or eliminating the requirement of expensive graphics processing unit (GPU). Thus, the development, training, and implementation of the ANN model may be performed by medium scale computing resource. The reduced computation complexity further enhances efficiency by reducing processing time while training the ANN model, thereby enabling delivery of NLP projects within shorter timeframe. The reduced memory requirement and computation complexity further enables training of two or more corpora in parallel.

The specification has described method and system for optimizing memory requirement for training an ANN model employed for NLP. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of optimizing memory requirement for training an artificial neural network (ANN) model employed for natural language processing (NLP), the method comprising:
receiving, by a memory optimization device, a plurality of training parameters and a plurality of model parameters, wherein the plurality of training parameters are derived from a training data corpus for training the ANN model, and wherein the plurality of model parameters are associated with the ANN model and are derived based on the plurality of training parameters and an input from a user with respect to the ANN model;
selecting, by the memory optimization device, a set of model parameters from among the plurality of model parameters for training the ANN model based on a characteristic and an architecture of the ANN model;
masking, by the memory optimization device, the set of model parameters in one or more layers of the ANN model based on a set of pre-defined rules to generate a set of masked model parameters;
determining, by the memory optimization device, an amount of memory required for training the ANN model based on the set of masked model parameters, wherein determining the amount of memory required comprises performing multi-linear regression with known values of the set of model parameters; and
providing, by the memory optimization device, the set of masked model parameters for training the ANN model when the amount of memory required is less than a determined threshold.

2. The method of claim 1, further comprising:
receiving the training data corpus;
deriving the plurality of training parameters by processing the training data corpus; and
temporarily storing the plurality of training parameters.

3. The method of claim 1, further comprising:
receiving the input from the user;
deriving the plurality of model parameters based on the plurality of training parameters and the input from the user; and
deploying the plurality of model parameters.

4. The method of claim 1, wherein determining the amount of memory required further comprises performing logistic regression when one or more of the known values are binary values.

5. The method of claim 1, wherein the plurality of model parameters comprise at least one of tokens, intents, named entities, word vectors, part of speech (PoS) tags, input features, input neurons, and output neurons.

6. The method of claim 5, wherein masking the set of model parameters using the set of pre-defined rules comprises at least one of stemming tokens, lemmatizing tokens, de-duplicating tokens, adjusting weights of tokens, converting tokens into hard coded binary numbers, and converting token types into hard coded binary numbers.

7. The method of claim 1, wherein masking the set of model parameters comprise masking the set of model parameters in one or more hidden layers of the ANN model.

8. The method of claim 1, further comprising:
training the ANN model with the set of masked model parameters; and
unmasking a resultant by back-propagating using the set of pre-defined rules.

9. The method of claim 1, further comprising iteratively selecting an updated set of model parameters, masking the updated set of model parameters, and determining the amount of memory required based on an updated set of masked model parameters until the amount of memory required is less than the determined threshold.

10. A system for optimizing memory requirement for training an artificial neural network (ANN) model employed for natural language processing (NLP), the system comprising:
a memory optimization device comprising at least one processor and a computer-readable medium storing instructions that, when executed by the at least one processor, cause the at least one processor to perform operations comprising:
receiving a plurality of training parameters and a plurality of model parameters, wherein the plurality of training parameters are derived from a training data corpus for training the ANN model, and wherein the plurality of model parameters are associated with the ANN model and are derived based on the plurality of training parameters and an input from a user with respect to the ANN model;
selecting a set of model parameters from among the plurality of model parameters for training the ANN model based on a characteristic and an architecture of the ANN model;
masking the set of model parameters in one or more layers of the ANN model based on a set of pre-defined rules to generate a set of masked model parameters;
determining an amount of memory required for training the ANN model based on the set of masked model parameters, wherein determining the amount of memory required comprises performing multi-linear regression with known values of the set of model parameters; and
providing the set of masked model parameters for training the ANN model when the amount of memory required is less than a determined threshold.

11. The system of claim 10, wherein determining the amount of memory required further comprises performing logistic regression when one or more of then known values are binary values.

12. The system of claim 10, wherein the plurality of model parameters comprise at least one of tokens, intents, named entities, word vectors, part of speech (PoS) tags, input features, input neurons, and output neurons, and wherein masking the set of model parameters using the set of pre-defined rules comprises at least one of stemming tokens, lemmatizing tokens, de-duplicating tokens, adjusting weights of tokens, converting tokens into hard coded binary numbers, and converting token types into hard coded binary numbers.

13. The system of claim 10, wherein masking the set of model parameters comprise masking the set of model parameters in one or more hidden layers of the ANN model.

14. The system of claim 10, wherein the operations further comprise:
training the ANN model with the set of masked model parameters; and
unmasking a resultant by back-propagating using the set of pre-defined rules.

15. The system of claim 10, wherein the operations further comprise:
iteratively selecting an updated set of model parameters, masking the updated set of model parameters, and determining the amount of memory required based on an updated set of masked model parameters until the amount of memory required is less than the determined threshold.

16. A non-transitory computer-readable medium storing computer-executable instructions for:
receiving a plurality of training parameters and a plurality of model parameters, wherein the plurality of training parameters are derived from a training data corpus for training an artificial neural network (ANN) model employed for natural language processing (NLP), and wherein the plurality of model parameters are associated with the ANN model and are derived based on the plurality of training parameters and an input from a user with respect to the ANN model;
selecting a set of model parameters from among the plurality of model parameters for training the ANN model based on a characteristic and an architecture of the ANN model;
masking the set of model parameters in one or more layers of the ANN model based on a set of pre-defined rules to generate a set of masked model parameters;
determining an amount of memory required for training the ANN model based on the set of masked model parameters, wherein determining the amount of memory required comprises:
performing multi-linear regression with known values of the set of model parameters; and
performing logistic regression when one or more of the known values are binary values; and
providing the set of masked model parameters for training the ANN model when the amount of memory required is less than a determined threshold.

17. The non-transitory computer-readable medium of claim 16, wherein masking the set of model parameters comprise masking the set of model parameters in one or more hidden layers of the ANN model.

* * * * *